UNITED STATES PATENT OFFICE.

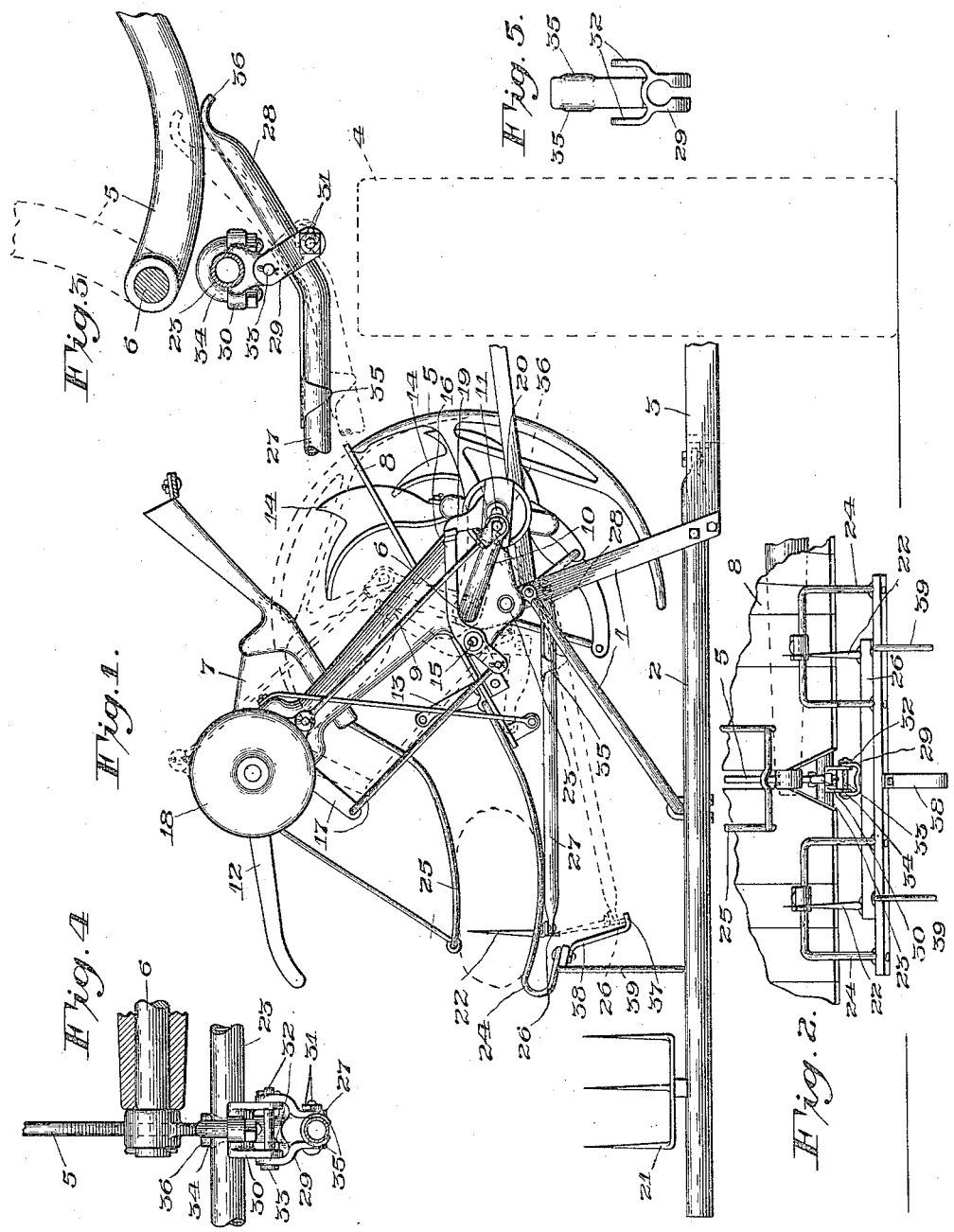

CLEMMA R. RANEY, OF CHICAGO, ILLINOIS, ASSIGNOR TO INTERNATIONAL HARVESTER COMPANY OF NEW JERSEY, A CORPORATION OF NEW JERSEY.

HARVESTING-MACHINE ATTACHMENT.

1,226,372.

Specification of Letters Patent. Patented May 15, 1917.

Application filed February 3, 1913. Serial No. 745,838.

*To all whom it may concern:*

Be it known that I, CLEMMA R. RANEY, a citizen of the United States, residing at Chicago, in the county of Cook and State of Illinois, have invented certain new and useful Improvements in Harvesting-Machine Attachments, of which the following is a full, clear, and exact specification.

My invention relates to harvesting machine attachments.

It has for its object to control the discharge of sheaves from a harvester in an improved manner, rendering the latter especially adapted to coöperate with a shocking machine. A further object of my invention is to position and retard the delivery of sheaves discharged from the harvester in such a manner that the same are delivered in the desired parallel relation and at the desired time to the sheaf delivering mechanism of a shocker. I attain these objects by providing improved means coöperating automatically with the needle operating mechanism of the harvester and operable to engage the sheaves discharged by the sheaf discharging mechanism thereof in an improved manner and at predetermined times.

In order that my invention may be clearly and fully disclosed, I have illustrated in the accompanying drawings one form which it may assume in practice. It is to be understood, however, that my invention may assume other forms than that shown herein for purposes of illustration.

Figure 1 is a front elevation of the sheaf forming and discharging mechanism of a harvester;

Fig. 2 is a detail view of the sheaf discharging side of the harvester;

Fig. 3 is a detail view of the holding tines and their operating and supporting means;

Fig. 4 is a detail view showing the connection of one of said tines to the frame;

Fig. 5 is a detail view of one of the holding clips for the tines.

The construction shown herein, when broadly considered, comprises the standard sheaf forming and binding mechanism of a harvester provided with improved means hereinafter described for retarding the delivery of a sheaf therefrom and positioning the same with respect to a coöperating shocker.

The sheaf forming and discharging mechanism shown is carried upon the stubbleward side of a binder and upon an auxiliary frame 1 supported and braced upon a laterally extending pipe 2 and the binder frame 3. It is driven through any suitable mechanism (not shown) connected to the main wheel 4 of the binder. As in the usual construction, a binding needle 5 is provided, which is rotatable with a transversely extending shaft 6 and is adapted to be oscillated therewith to coöperate with a knotter 7 and bind the sheaves, passing through the binder deck 8 in its movement to and from binding position. This needle derives its power through a link connection 9—10 from a power shaft 11 operatively connected through suitable gearing (not shown) to the rotatable discharging arms 12 in a well-known manner. As in the usual construction, a pivoted compressor or trip arm 13 is provided, which is movable through the binder deck and acts as an abutment for the sheaves as they are packed against the same by the usual sheaf packing mechanism 14. This compressor arm is fixed at its lower end to a transverse shaft 15 and movable with a pivoted clutch controlling member 16, which is likewise connected through a link and crank connection 17 with a discharge cam 18 operatively connected to the sheaf discharging mechanism in the usual manner. As in the usual construction, the gearing connection between the discharge arms 12 and the power shaft 11 is as one to three, so that while the former is rotated through a complete revolution, the shaft 11 is rotating through three complete revolutions, and the clutch controlling member 16 is adapted to be thrown into engagement with pawl 19 of the binder clutch 20 after each sheaf is discharged by the discharging mechanism.

Coöperating with this mechanism, I have illustrated a pivoted sheaf delivering member 21 of a shocker of the type described and claimed in my copending application Serial No. 573,106, filed July 21, 1910, wherein the member 21 is of the pivoted type and adapted to deliver the sheaves ejected from the binder one by one to the sheaf receiving cradle of a shocker. It is to be noted that the member 21, as shown in Fig. 1, is in the sheaf receiving position, wherein it is located in a plane beneath the sheaf discharging mechanism of the binder, with its tines extending vertically upward, so that when a sheaf is discharged from the binder it is securely impaled thereon. If desired, this sheaf delivering member may be automatically controlled in the same manner described and claimed in the above mentioned application, and may be provided with improved means coöperating with the binding and discharging mechanism of the shocker in such a manner as to render the same inoperative while the sheaves delivered by it are being bound by the shocker.

In my improvement I provide improved means coöperating with the sheaf binding and discharging mechanism of the binder which are controlled by the binder needle 5 and adapted to delay the delivery of a sheaf and position the same with respect to this member 21 to which it is to be delivered in an improved manner. These means are shown herein in the form of a plurality of parallel upwardly extending sheaf piercing tines 22 pivotally connected at their inner ends to a shaft 23 carried upon the frame 1 at a point beneath the binder deck. As shown in Fig. 1, these members are each adapted to move upward through a supplemental deck 24 forming an extension of the main binder deck 8 beneath the spring discharge arms 25 of the sheaf discharging mechanism, and, as shown in Fig. 2, are spaced apart from each other and connected by an angle iron or strip of other material 26 so that they move together and pierce the sheaves discharged upon the supplemental deck at different points in their length in such a manner as to accurately position the same upon the latter and prevent angular movement of the same with respect to the deck or the sheaf receiving member 21. At a point intermediate its ends the angle iron or strip 26 is pivotally connected to the shaft 23 by an improved link connection comprising an inwardly extending connecting rod 27, having an upwardly and angularly disposed end portion 28 pivotally connected, through an elongated movable bracket 29, with a bracket 30 fixed to the shaft 23. The bracket 29 is preferably provided with downwardly extending lugs adapted to be clamped on opposite sides of the rod 27 by a bolt and nut connection 31, and is likewise provided with upwardly extending arms 32 adapted to receive a pivot pin 33 carried by the depending arms of the bracket 30. As shown in Fig. 3, the bracket 30 may be attached to the shaft 23 by any suitable means; as, for instance, a U-bolt 34.

In order to position the rod 27 with respect to its bracket 29, the latter is provided, near its outer end, with downwardly extending ears 35 on opposite sides of the rod. It is also to be noted that this rod at its rear end is provided with a rounded downwardly curved tail portion 36 which is adapted to be engaged by a portion of the needle 5 at predetermined times in the course of the operation of the latter to force the tines 22 on the outer end of the rod 27 upward about their pivot on the pin 33. It is further to be noted that the downward movement of the tines 22 and angle iron 26 is limited by engagement of the latter with a rearwardly projecting lip 37 on a depending bracket 38 preferably fixed to the under side of the supplemental deck 24 adjacent a U-shaped deck support 39 extending between the deck 24 and the pipe 2.

The operation of the construction shown is as follows: Let us assume that, as shown in Fig. 1, the needle 5 is in its lower position wherein it depresses the inner end of the rod 27 and forces the tines 22 upward so that they pierce a sheaf carried upon the supplemental deck, that the discharge arms 12 are in the full line position shown, that the compressor arm 13 is raised in the full line position shown and that the clutch controlling member 16 is in engagement with the clutch pawl 19. As in the usual construction, the packer arms 14 are continuously operating. When these packer arms have packed a predetermined amount of grain against the compressor arm 13, the latter is thrown backward automatically about its pivot to throw the clutch controlling member 16 out of engagement with the pawl 19 and operatively connect the sheaf discharging mechanism with the power shaft 11. As in the usual construction, the discharge arms 12 of this mechanism move in a clockwise direction about their pivot. At the same time, through the link connection 9—10, the binding needle 5 is simultaneously thrown upward to coöperate with the knotter 7 in binding the grain which has been packed. As the binding needle moves upward it is automatically disengaged from the inner end of the tine operating rod 27 and the tines 22 on the opposite end of the latter are permitted to drop of their own weight to release the sheaf upon the supplemental deck, so that when the discharge arms 12 move around through their complete revolution they discharge the sheaf which has just been bound and force the same outward upon the supplemental deck and against this sheaf, pushing the latter over the edge of the supplemental deck upon the sheaf delivering member 21 of the shocker mechanism, so that it may be carried away thereby. Obviously, prior to the completion of the operation of the discharge mechanism, the needle 5, due to its link connection 9—10, is again thrown downward to its initial position ready to operate upon the next sheaf. As it thus moves downward a portion of the same automatically engages the curved end 36 of the member 27, thus automatically raising the tines 22 on the outer end thereof so that they pierce the sheaf which has just been discharged. As in the usual construction, the compressor arm 13 is automatically returned to its full line position as soon as the bound sheaf is discharged, and at the time the discharge arms 12 again reach the full line position the clutch controlling member 16 is again thrown into engagement with the revolving clutch finger 19 by means of the link connection 17. In this position the parts are again ready to operate upon the next sheaf formed by the continuously operating sheaf packing mechanism.

It is to be noted that the holding tines 22 serve to maintain the sheaf in parallel relation with respect to the discharge arms and the sheaf delivering member 21 of the shocker. It is further to be noted that since these tines pierce the sheaf, they further act to prevent the same from being moved too far outward upon the supplemental deck and serve to control the discharge mechanism so that the latter can only discharge one sheaf at a time to the sheaf delivery member 21. The mechanism for operating these tines is also entirely automatic in its operation and, through its connection to the binding needle, is automatically timed so that its tines are only thrown upward when the sheaf has been bound by the needle and projected outward to the desired degree by the sheaf discharging mechanism. Attention is further directed to the fact that the sheaf holding mechanism shown herein may be readily adapted to the sheaf forming and discharging mechanism of a binder of standard construction and that the same are adapted to coöperate therewith without any interference with the usual operation of the sheaf forming and discharging mechanism.

While I have described in this application one form of my invention, it is, of course, to be understood that the embodiment shown herein for purposes of illustration may be modified without departing from the spirit of my invention.

What I claim as my invention, and desire to secure by Letters Patent, is:

1. In a harvester, sheaf binding mechanism, sheaf discharging mechanism, and sheaf discharge retarding means controlled by said binding mechanism.

2. In a harvester, sheaf binding and discharging mechanism, and sheaf discharge retarding means coöperating therewith and controlled by one of said mechanisms.

3. In a harvester, sheaf binding mechanism, sheaf discharging mechanism, and a sheaf discharge limiting member operatively connected to said binding mechanism and actuated thereby.

4. In a harvester, sheaf binding mechanism, sheaf discharging mechanism, and a plurality of supplemental discharge retarding sheaf piercing tines operatively connected to said binding mechanism.

5. In a harvester, sheaf binding mechanism, sheaf discharging mechanism and a sheaf retaining member successively operated by said binding mechanism after each binding operation to retard the discharge of the bound sheaves.

6. In a harvester, sheaf binding mechanism including a binding needle, sheaf discharging mechanism, and a sheaf holding member movable by said needle to operative position as the latter is retracted from sheaf binding position.

7. In a harvester, sheaf discharging mechanism, sheaf binding mechanism, and means operatively connected to one of said mechanisms for delaying the ejection of a bound sheaf.

8. In a harvester, sheaf discharging mechanism, a coöperating binding needle, and a sheaf piercing and holding member operable by the latter to stop a sheaf discharged by said discharging mechanism.

9. In a harvester, sheaf discharging mechanism, a binding needle coöperating therewith, and a sheaf holding member engaged by said needle and thrown into operation upon the return thereof from its binding position.

10. In a harvester, a binder deck, sheaf discharging mechanism, sheaf binding mechanism, and sheaf holding means operatively connected to one of said mechanisms and coöperating with the other thereof to retard the ejection of a sheaf from said deck.

11. In a harvester, a binder deck, sheaf discharging mechanism thereon, a binding needle operatively connected thereto, and sheaf holding means operated by said binding needle to position a sheaf upon said binder deck after it has been operated on by said discharging mechanism.

12. In a harvester, rotatable sheaf discharging mechanism, sheaf binding mechanism including a needle coöperating therewith, and means operable by said needle after the operation of said discharging mechanism and during the return of said needle to its inoperative position to stop a sheaf discharged by said discharging mechanism.

13. In a harvester, a binder deck, sheaf binding mechanism including a needle movable therethrough, a supplemental deck forming an extension of said binder deck, sheaf discharging mechanism, and a sheaf holding member pivotally connected beneath said binder deck and operable by said binding needle to retain upon said supplemental deck a sheaf bound by said needle and discharged by said discharging mechanism.

14. In a harvester, a binder deck, sheaf binding mechanism including a needle movable therethrough, sheaf discharging mechanism coöperating with said needle, and a plurality of sheaf piercing tines carried beneath said deck and movable by said needle through said deck to retard the delivery of a sheaf discharged thereon by said sheaf discharging mechanism.

15. In a harvester, sheaf binding mechanism, sheaf discharging mechanism, a binder deck, and means operatively connected to said binding mechanism and retaining a sheaf on said binder deck releasable from said sheaf as a second sheaf is discharged by said discharging mechanism and engageable with the sheaf just discharged.

16. In a harvester, a frame, a binder deck thereon having an elongated discharge chute, sheaf discharging mechanism, sheaf binding mechanism, and means operatively connected to the latter whereby a sheaf is retained in fixed position at the delivery end of said chute until the discharge of another sheaf by said discharging mechanism.

17. In a harvester, sheaf binding mechanism, sheaf discharging mechanism, a binder deck, discharge retarding means, and means operatively connected to said binding mechanism and said discharge retarding means whereby upon the discharge of a sheaf by said discharging mechanism a sheaf retarded by said retarding means is released and after it has been pushed over the edge of said deck by said first mentioned sheaf the latter is retarded.

18. In combination, a binder frame, sheaf discharging mechanism thereon, sheaf binding mechanism thereon, a binder deck thereon, a laterally extending support protruding therefrom beneath said deck, an upwardly movable sheaf delivery member normally carried on said support beneath said binder deck, and means operatively connected to said binding mechanism and movable upward through said deck engageable upward through said deck engageable with a sheaf thereon and releasable therefrom upon the discharge of a second sheaf by said discharging mechanism.

19. In a harvester, a frame, a binder deck thereon, a binding needle journaled on said frame movable through said deck, a bracket pivoted on said frame beneath said deck, a stubblewardly extending member carried by said bracket member and having its grainward end engageable with said needle, a cross piece carried on the stubbleward end of said member, and a plurality of spaced upstanding tines carried on said cross piece and movable upward through said binder deck.

20. In a harvester, a frame, a binder deck thereon, a binding needle journaled on said frame movable through said deck, a bracket pivoted on said frame beneath said deck, a stubblewardly extending member carried by said bracket member and having its grainward end engageable with said needle, a cross piece carried on the stubbleward end of said member, a plurality of spaced upstanding tines carried on said cross piece and movable upward through said binder deck, and means for limiting the movement of said tines in one direction.

In testimony whereof I affix my signature, in the presence of two witnesses.

CLEMMA R. RANEY.

Witnesses:
 RAY D. LEE,
 RAY PATTISON.

Copies of this patent may be obtained for five cents each, by addressing the "Commissioner of Patents, Washington, D. C."